United States Patent [19]
Takahashi

[11] Patent Number: 5,862,118
[45] Date of Patent: Jan. 19, 1999

[54] OPTICAL PICKUP WITH AN OPTICAL SYSTEM CONTROLLED BY AN ACTUATOR WITH RESPECT TO ONE OF THE INFORMATION RECORDING LAYERS

[75] Inventor: Shinichi Takahashi, Tokorozawa, Japan

[73] Assignee: Pioneer Electronic Corporation, Japan

[21] Appl. No.: 877,470

[22] Filed: Jun. 17, 1997

[30] Foreign Application Priority Data

Jun. 21, 1996 [JP] Japan ..................................... 8-162239

[51] Int. Cl.⁶ ........................................................ G11B 7/00
[52] U.S. Cl. ........................ 369/112; 369/94; 369/44.23; 369/44.37
[58] Field of Search ............................. 369/94, 112, 109, 369/110, 44.14, 44.23, 44.24

[56] References Cited

U.S. PATENT DOCUMENTS

| | | | |
|---|---|---|---|
| 5,446,565 | 8/1995 | Komma et al. | 369/94 |
| 5,526,336 | 6/1996 | Park et al. | 369/94 |
| 5,699,341 | 12/1997 | Sugi et al. | 369/112 |
| 5,701,288 | 12/1997 | Seong | 369/112 |

*Primary Examiner*—Tod R. Swann
*Assistant Examiner*—Kim-Kwok Chu
*Attorney, Agent, or Firm*—Nixon & Vanderhye

[57] ABSTRACT

An optical pickup apparatus for reproduction of an information record medium in which information record layers are multiply formed is provided with: a light source for emitting a light beam; a light detector for detecting a reflection light beam and outputting a light detection signal corresponding to the detected reflection light beam; an optical system for condensing the emitted light beam onto one of the information record layers and condensing the light beam reflected from one of the information record layers as the reflection light beam onto the light detector; and an actuator for at least partially actuating the optical system in a focus servo direction to focus-servo-control the emitted light beam with respect to one of the information record layers on the basis of a focus error signal generated from the light detection signal outputted by the light detector. The optical system is designed so as to satisfy the expression of S<0.63 d/n wherein S represents a distance between two focal points of the actuated optical system which respectively give maximum and minimum values of the focus error signal, d represents an interval between the information record layers, and n represents a refractive index of a spacer medium between the information record layers.

3 Claims, 9 Drawing Sheets

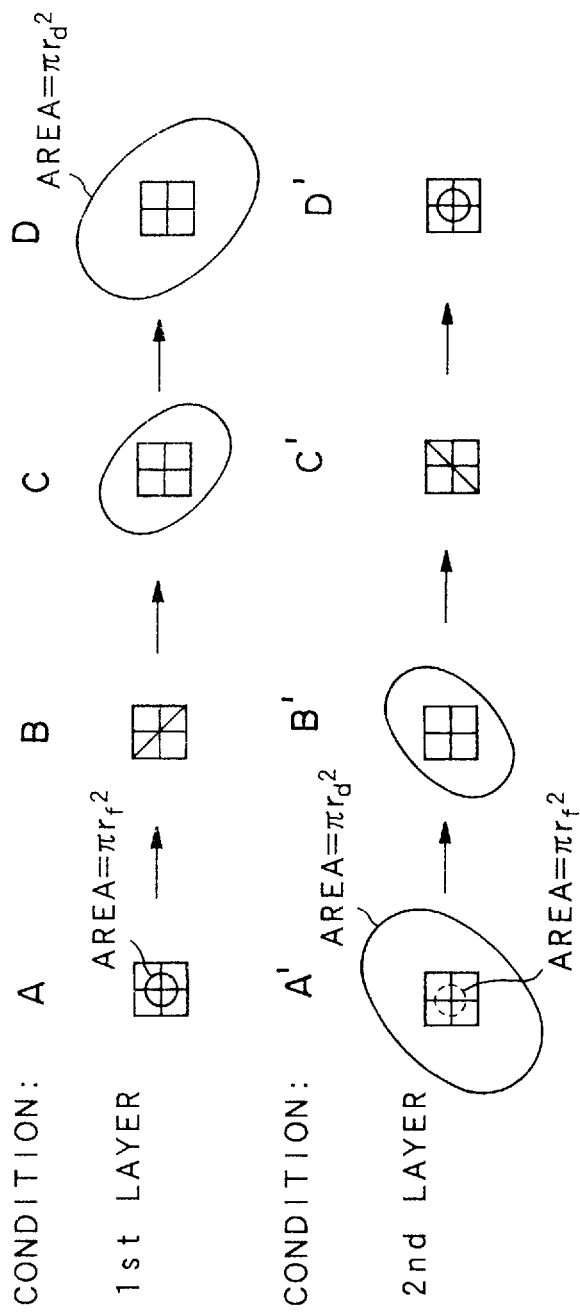

OPTICAL PICKUP WITH AN OPTICAL SYSTEM CONTROLLED BY AN ACTUATOR WITH RESPECT TO ONE OF THE INFORMATION RECORDING LAYERS

BACKGROUND OF THE INVENTION

1. Field of the Invention

The present invention relates to an optical pickup apparatus for reproduction of an information record medium in which information record layers are multiply formed.

2. Description of the Related Art

An optical disk such as a DVD (Digital Video or Versatile Disk) may have such a construction that information record layers are multiply formed so as to improve the record density. At a time of reproducing this type of optical disk, the light beam from the optical pickup is condensed or focused on one of the information record layers of the optical disk, and its reflection light is condensed on a photo detector However, if the light beam is condensed on one information record layer in the above described manner, the reflection light from another information record layer in a defocus condition is superimposed to the record signal at a time of reproducing one information record layer. This results in a cross talk condition of the record signals. Since there is no correlation between the record signals of these information record layers to each other, there is raised a problem that the signal from another information record layer gives a harmful effect as a random noise onto the quality of the record signal of one information record layer to be reproduced.

SUMMARY OF THE INVENTION

It is therefore an object of the present invention to provide an optical pickup apparatus for reproduction of the information record medium of multiple layered type, which can restrain the cross talk of the record signals.

The above object of the present invention can be achieved by an optical pickup apparatus for reproduction of an information record medium in which information record layers are multiply formed. The optical pickup apparatus is provided with: a light source for emitting a light beam; a light detector for detecting a reflection light beam and outputting a light detection signal corresponding to the detected reflection light beam; an optical system for condensing the emitted light beam onto one of the information record layers and condensing the light beam reflected from one of the information record layers as the reflection light beam onto the light detector; and an actuator for at least partially actuating the optical system in a focus servo direction to focus-servo-control the emitted light beam with respect to one of the information record layers on the basis of a focus error signal generated from the light detection signal outputted by the light detector. The optical system is designed so as to satisfy the expression of $S < 0.63$ d/n wherein S represents a distance between two focal points of the actuated optical system which respectively give maximum and minimum values of the focus error signal, d represents an interval between the information record layers, and n represents a refractive index of a spacer medium between the information record layers.

According to the optical pickup apparatus of the present invention, the optical system is designed so as to satisfy the expression of $S < 0.63$ d/n wherein S represents the distance between two focal points of the actuated optical system respectively giving maximum and minimum values of the focus error signal. Thus, the ratio of the light detection signal from one of the information record layers to be reproduced with respect to the light detection signal from another of the information record layers (which can be expressed as a ratio of the area of the light spot, which is formed of the reflection light beam from each of these information record layers and is focused or condensed on the light detector) can be restrained low enough to reduce the random noise (i.e. the cross talk of the light detection signals), which corresponds to the light detection signal from another of the information record layers, to a certain level causing no noise problem in a practical sense.

In the optical pickup apparatus of the present invention, the optical system may comprise at least one of an objective lens, a collimator lens, a cylindrical lens and a concave lens, so that the emitted light beam can be condensed onto one of the information record layers and the reflection light beam can be condensed onto the light detector by use of a relatively simple optical structure.

In the optical pickup apparatus of the present invention, the light detector may comprise a four divided detector for outputting the light detection signal, so that the focus error signal can be easily and certainly generated from the light detection signal of the four divided detector by use of a known astigmatic method for example.

The nature, utility, and further features of this invention will be more clearly apparent from the following detailed description with respect to preferred embodiments of the invention when read in conjunction with the accompanying drawings briefly described below.

BRIEF DESCRIPTION OF THE DRAWINGS

FIG. 3 is a diagram showing the change in the shape of a light spot of the reflection light from a focus condition to a defocus condition for a first layer of the multiple layered disk, and the change in the shape of a light spot of the reflection light for a second layer at respectively corresponding times;

DETAILED DESCRIPTION OF THE PREFERRED EMBODIMENTS

Referring to the accompanying drawings, embodiments of the present invention will be now explained.

Figure 1:
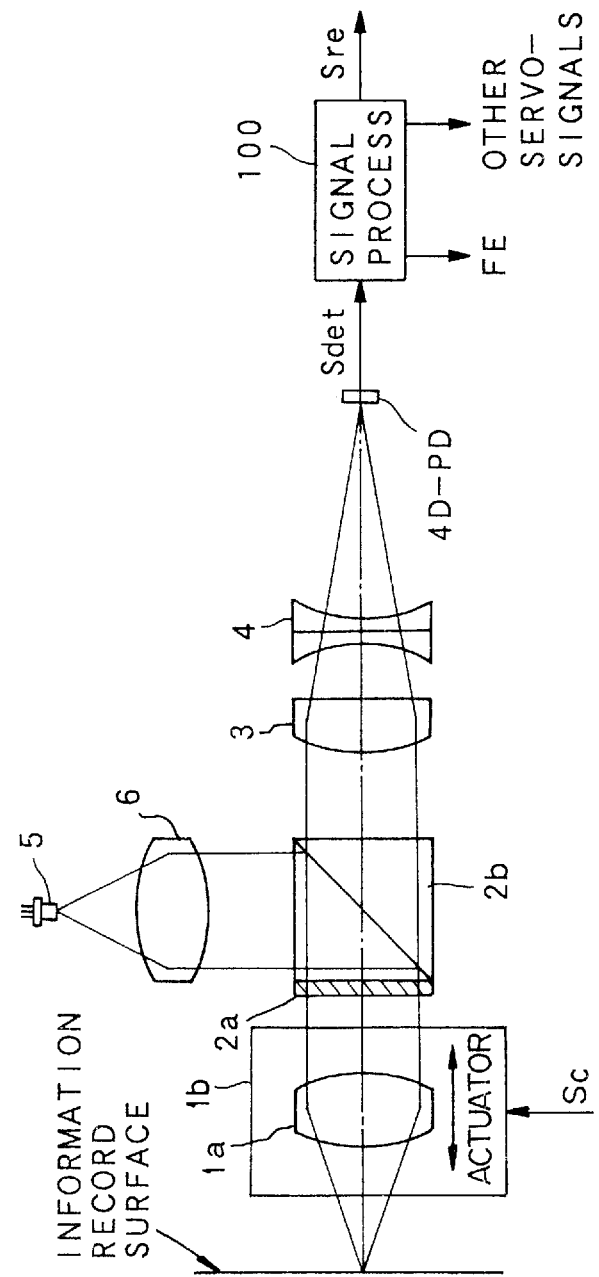
FIG. 1 is a diagram of an optical pickup apparatus as an embodiment of the present invention.

FIG. 1 is a diagram showing a construction of an optical pickup apparatus for reproduction of an information record medium as an embodiment of the present invention. As shown in FIG. 1, the optical pickup apparatus is provided with: an objective lens 1a; an actuator 1b; a quarter wavelength plate 2a; a beam splitter 2b; a collimator lens 3; a composite lens 4 of a cylindrical lens and a concave lens; a 4-divided photo detector (hereinafter, it is referred to as a "PD"); a semiconductor laser (hereinafter, it is referred to as a "LD") 5; and a coupling lens 6. The optical pickup apparatus is constructed as following. Namely, the laser beam irradiated from the LD 5 is condensed or focused on one information record layer (as the information record surface in FIG. 1) of the information record disk. The reflection light from the information record surface is condensed on the PD through each lens so as to read the information. More concretely, the PD outputs a light detection signal Sdet corresponding to the detected reflection light to a signal process unit 100. then, the signal process unit 100 generates a focus error signal FE by means of a known astigmatic method for example, and other servo signals as well as a reproduced record signal Sre. A focus control signal Sc is generated on the basis of the focus error signal FE to form a focus servo loop. Then, the laser beam is servo-controlled by the actuator 1b in the focus servo direction (indicated by arrows in FIG. 1), as the actuator 1b actuates the objective lens 1a according to the focus control signal Sc, as well as the tracking servo direction.

Figure 2A:
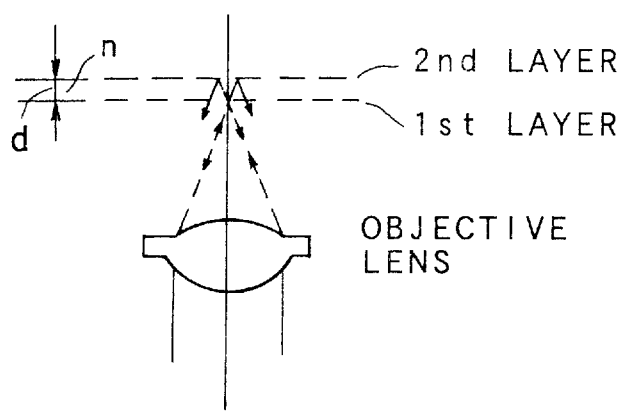
FIG. 2A is a sectional view of a reflection light showing its locus at a time of reproducing a multiple layered disk by use of the optical pickup apparatus of FIG. 1.
Figure 2B:
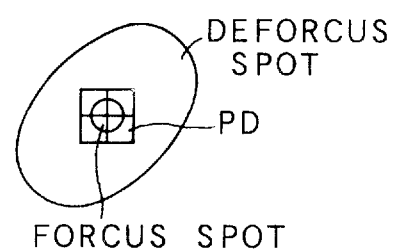
FIG. 2B is a plan view of a light spot at a photo detector position of the reflection light at the time of reproducing the multiple layered disk by use of the optical pickup apparatus of FIG. 1.

If the information record disk of multiple layered type, such as a DVD of multiple layered type, is reproduced by use of the optical pickup apparatus having the above explained construction as shown in FIG. 2A, the condition of the return light from each of the first and second layers becomes as shown in FIG. 2B. In FIG. 2A, the first and second information record layers are spaced from each other by an interval (i.e. distance) d, and the spacer medium between the first and second layers has a refractive index n. Here, FIG. 2B shows the condition where the first layer is being reproduced. Namely, a focus spot, which is a focused light spot, is formed of the reflection light from the first layer on the photo detection surface of the PD, and a defocus spot, which is a light spot and is not focused, is formed of the reflection light from the second layer on the photo detection surface of the PD. In other words, when the record information is to be read from one of the information record layers (which is a semi reflective layer), the reflection light from another of the information record layers (which is a high or semi reflective layer) is also received through the semi reflective layer (i.e. the first layer) by the PD, so that the cross talk of the record signals is generated. Then, since there is no correlation between the record signals of the first and second layers, another signal influences as a random noise to one signal and a harmful effect is given to the signal quality of the read signal.

Therefore, in order to quantitatively restrain or restrict this cross talk, a study as following is made. Firstly, since it can be assumed that the light detection signal from each record layer is ideally proportional to the light detection amount on the PD, the area of the light spot is studied.

FIG. 3 shows the chance in the shape of the light spot of the reflection light from each layer in correspondence with its focus or defocus condition respectively. More concretely, in the order of conditions A, B, C and D, the shape of the light spot of the reflection light from the first layer is changed from a focus condition to a defocus condition. Further, each of conditions A', B', C' and D' indicates the shape of the light spot of the reflection light from the second layer in correspondence with the respective one of these conditions A, B, C and D.

As understood from FIG. 3, with respect to the second layer, which becomes in the defocus condition (i.e. the condition A') when the first layer becomes in the focus condition (i.e. the condition A), only one portion of the light spot having the defocus spot area $\pi r_d^2$ is photo-detected by the PD as indicated by the condition A' in FIG. 3, so that the light detection amount is less than that at the time of the focus condition for the second layer shown in the condition D' in FIG. 3. Since the total light amount of the reflection light is unchanged in each of the conditions A' to D' in FIG. 3, the light amount in the area $\pi r_d^2$ at the time of the defocus condition as indicated by the condition A' in FIG. 3 and the light amount in the area $\pi r_f^2$ at the time of the focus condition as indicated by the condition D' in FIG. 3 are equal to each other. Therefore, the light amount receivable by the PD at the time of the defocus condition for the second layer as indicated by the condition A' in FIG. 3 is equal to the light amount corresponding to the area $\pi r_f^2$ with respect to the total light amount corresponding to the area $\pi r_d^2$.

On the other nand, as indicated by the condition A in FIG. 3, at the time of the focus condition for the first layer, the reflection light at the whole focus spot area $\pi r_f^2$ is received. The light amount at this time is equal to the light amount in the area $\pi r_d^2$ at the time of the defocus condition (i.e. the condition D in FIG. 3) for the first layer. Then, since this area $\pi r_d^2$ at the time of the defocus condition for the second layer is equal to the area $\pi r_d^2$ of the defocus spot of the second layer as indicated by the condition A' in FIG. 3, the ratio of the area $\pi r_f^2$ with respect to the area $\pi r_f^2$ as indicated by the condition A' in FIG. 3 can be assumed to be equal to the ratio of the light detection amount of the reflection light at the time of the defocus condition for the second layer with respect to the total light receiving amount of the reflection light at the time of the focus condition for the first layer. Namely, this ratio can be expressed as following.

$$\pi r_f^2 / \pi r_d^2 = \text{(the light detection signal from the second layer)} / \text{(the light detection signal from the first layer)}$$

Figure 4A:
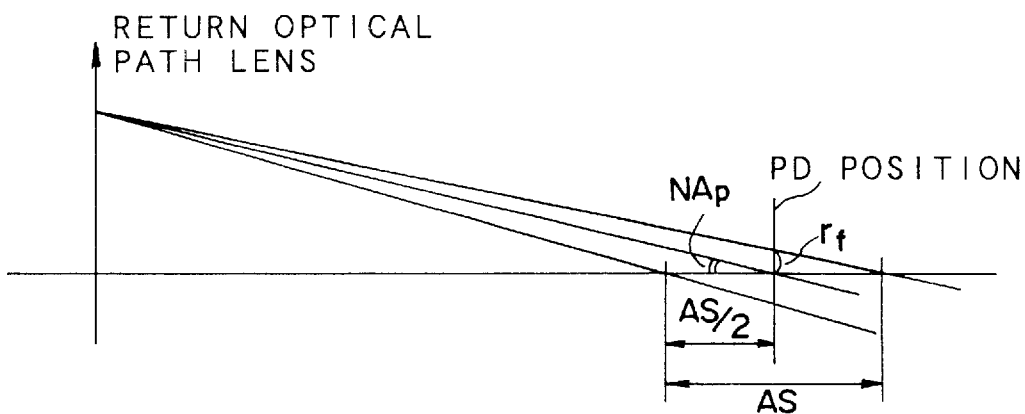
FIG. 4A is a graph showing a trace of a paraxial ray to obtain a radius of a focus spot.

Here, assuming that the NA (Numerical Aperture) at the side of the PD is NAp, the astigmatic difference on the PD is AS, the S letter interval or width of the focus error signal FE is S and the lateral magnification of the optical path (i.e. the return magnification) is β, the spot radius $r_f$ at the time of the focus condition is expressed as following, as understood from FIG. 4A.

$$r_f = NAp^*(\Delta S/2) = NAp^*(2S^*\beta^2/2) = NAp^*S^*\beta^2$$

Figure 4B:
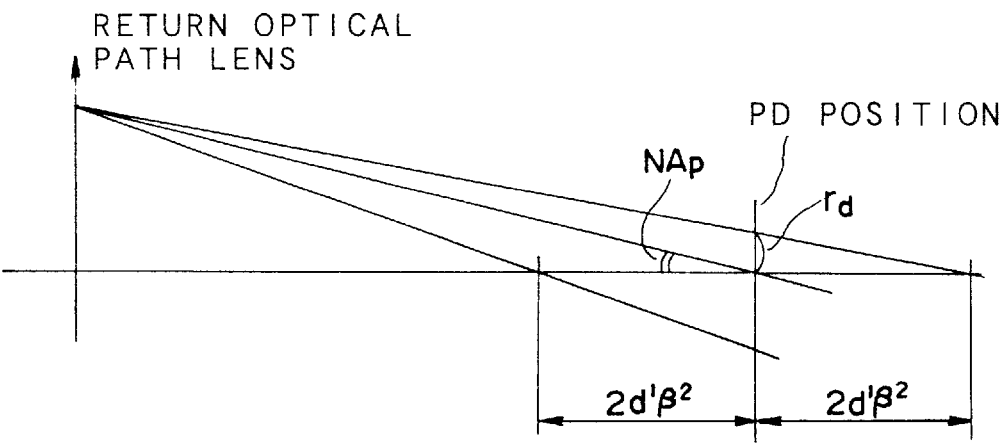
FIG. 4B is a graph showing a trace of a paraxial ray to obtain a radius of a defocus spot.

On the other hand, assuming that the optical distance between first and second layers is d'(=d/n; n is the refractive index of the spacer medium between the information record layers), the spot radius $r_d$ at the time of the defocus condition is expressed as following, as understood from FIG. 4B.

$$r_d = NAp^*2d'^*\beta^2$$

Figure 4C:
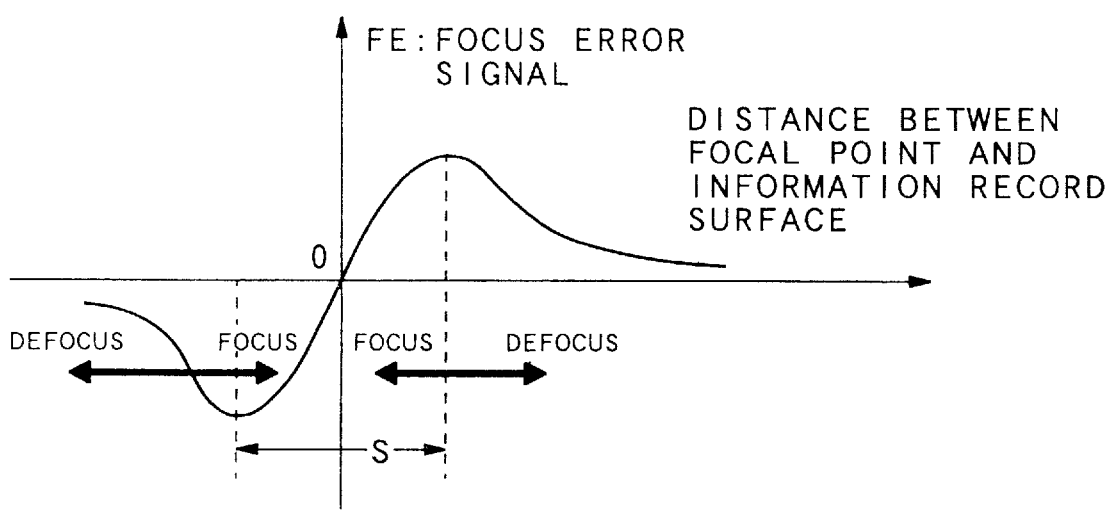
FIG. 4C is a graph showing a S letter interval of the focus error signal.

FIG. 4C is a graph for explaining the S letter interval of the focus error signal FE. As shown in FIG. 4C, the focus error signal FE by means of the astigmatic method has the maximum and minimum peak values to form the so-called S letter curve with respect to the focal point shift (i.e. the shift or distance between the focal point and the information record surface). The S letter interval is the distance between two focal points of the actuated objective lens 1a which respectively give the maximum and minimum values of the focus error signal FE.

By the above two expressions for $r_f$ and $r_d$, the ratio can be expressed as following.

$$\pi r_f^2/\pi r_d^2 = (S/2d')^2$$

Therefore, according to the present invention, the ratio of the light detection signal from another layer (i.e. the noise) with respect to the light detection signal from one layer to be reproduced (i.e. the signal) is defined as a cross talk CT. Namely, assuming that the light detection signal from one layer to be reproduced is Sg, and that the light detection signal from another layer is Ns, the cross talk CT is defined as following.

$$CT = Ns/Sg = \pi r_f^2/\pi r_d^2 = (S/2d')^2$$

Then, the optical system is designed so as to make this value of the cross talk CT less than a predetermined value.

Figure 5:
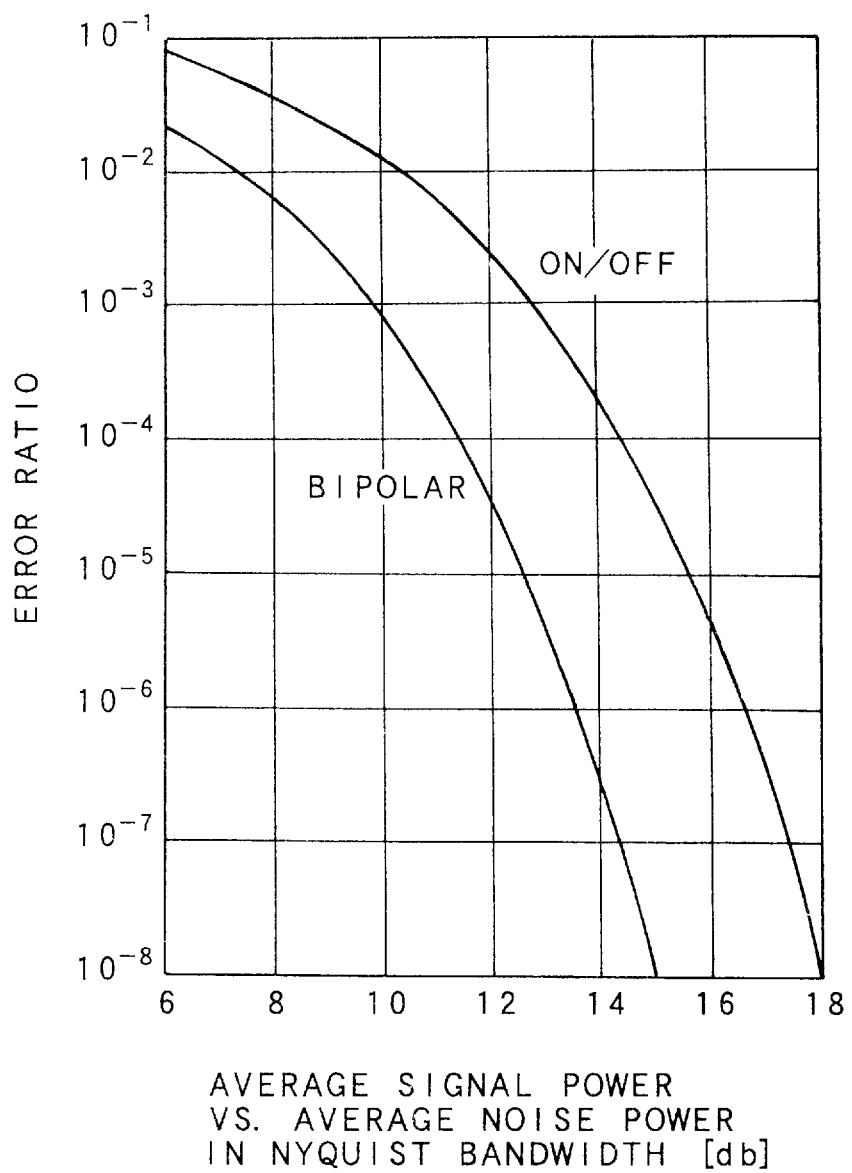
FIG. 5 is a graph showing an error ratio of each of a random bipolar binary base band signal and a random ON/OFF binary signal in case that an additive white Gauss noise exists.
Figure 6:
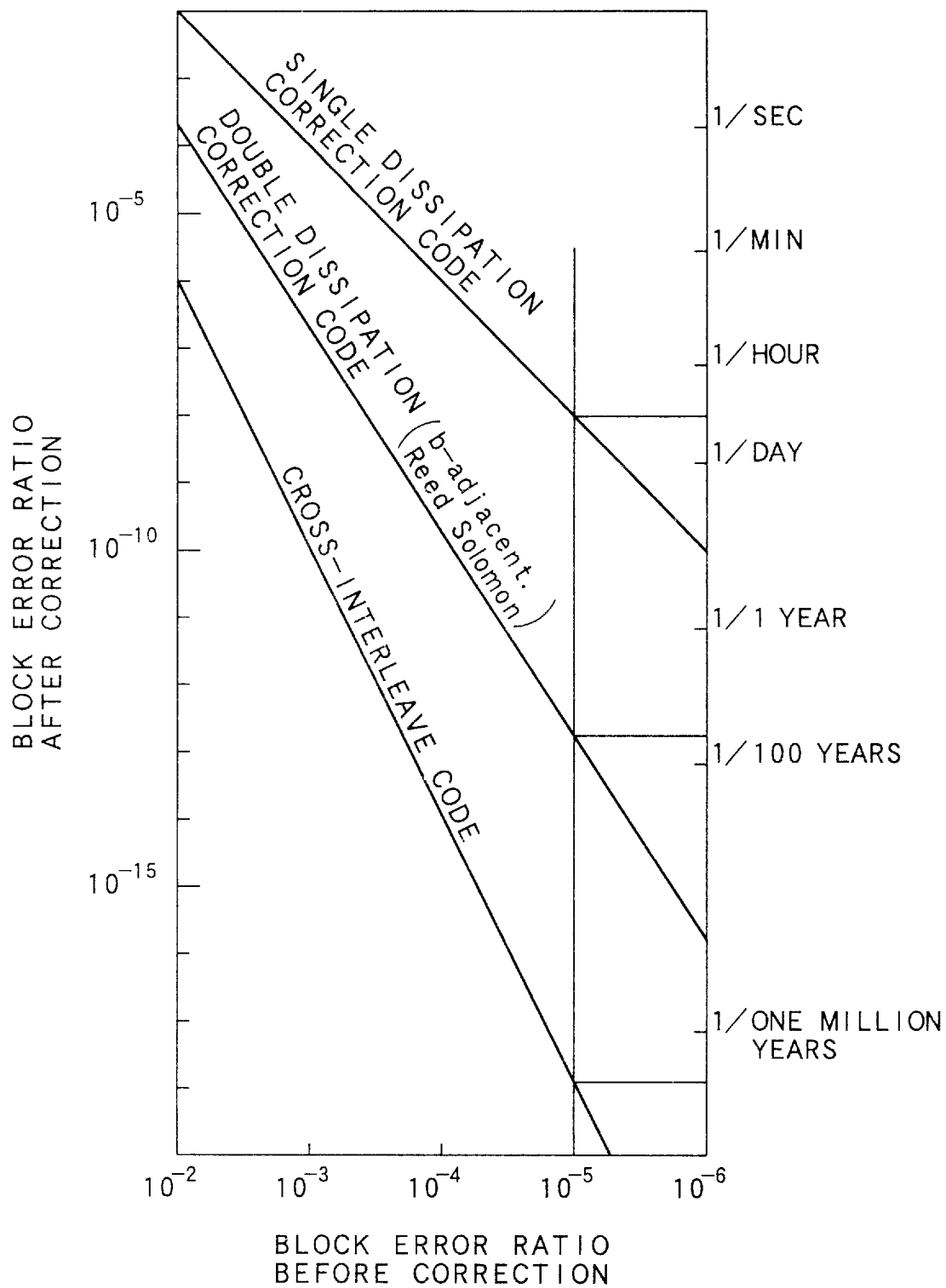
FIG. 6 is a graph showing a random error correcting capability for various codes.

Next, by making a study for an appropriate value of the cross talk CT on the basis of the relationship between a general signal to noise power ratio and a bit error ratio, the following fact is turned out to be clear. Namely, according to the "DATA TRANSMISSION" (William R. Bennett et al, LATTICE Corporation ltd., 1966), the signal to noise power ratio is about 15 dB in the random bipolar binary base band signal when the bit error ratio is $10^{-8}$, and this bit error ratio $10^{-8}$ is equivalent to the block error ratio $6\times10^{-6}$ in the data structure of the compact disk for example, as shown in FIG. 5. Thus, according to the "DIGITAL AUDIO NEW VERSION" (Doi et al, RADIO TECHNICAL CORPORATION, 1987), a condition where there is raised no practical problem after the error correction can be obtained by use of the cross interleave code in the error correction method, as shown in FIG. 6.

As described above, in order to obtain the enough bit error ratio after the correction, the signal to noise power ratio may be not less than 20 dB. Therefore, in the present invention, it can be judged that the ratio Sg/Ns, which is the ratio of the light detection signal Sg from one record layer to be reproduced with respect to the light detection signal from another record layer, may be not less than 20 dB. Namely, in the present invention, the cross talk CT is defined as following.

$$CT = Ns/Sg = \pi r_f^2/\pi r_d^2 = (S/2d')^2$$

Thus, the optical system is set so as to satisfy the condition expressed by a following expression.

$$20 log(S/2d')^2 \leq -20$$

$$\therefore S/d' \leq 0.63$$

In other words, if the optical system is designed so as to obtain the S letter interval (see FIG. 4C), which satisfies this expression, the cross talk expressed by the S letter interval and the optical distance between the information record layers can be reduced, so that the enough bit error ratio after the correction can be obtained.

Figure 7:
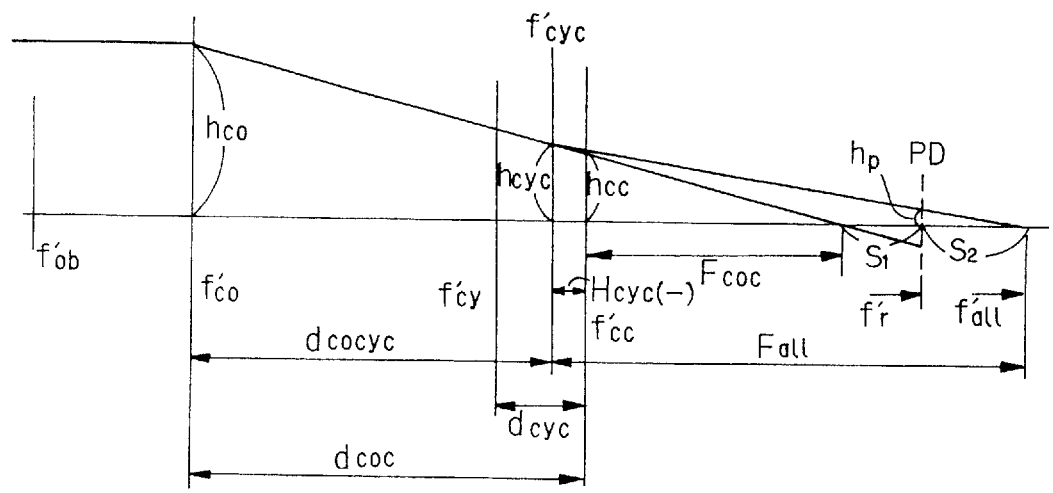
FIG. 7 is a diagram showing a trace of a paraxial ray for explaining an arrangement of each lens in the optical pickup apparatus of FIG. 1.

Hereinbelow, a concrete design example of such an optical system is explained. FIG. 7 is a trace diagram of a parallax ray for explaining the arrangement of each lens in the present embodiment. In FIG. 7, a reference mark $f_{ob}$ represents a focal length of the objective lens, $f_{co}$ represents a focal length of the collimator lens, $f_{Cy}$ represents a focal length of the cylindrical lens, $f_{cc}$ represents a focal length of the concave lens, $f_{cyc}$ represents a focal length of the composite lens of the cylindrical lens and the concave lens, $h_{co}$ represents a radius of a most outer light at the main surface position of the collimator lens, $h_{cc}$ represents a radius of a most outer light at the main surface position of the concave lens, $h_{cyc}$ represents a radius of a most outer light at the main surface position of the composite lens of the cylindrical lens and the concave lens, $h_p$ represents a radius of a most outer light at the PD surface, $d_{cocyc}$ represents a distance between the main surface of the collimator lens and the main surface of the cylindrical/concave composite lens, $d_{coc}$ represents a distance between the main surface of the collimator lens and the main surface of the concave lens, $d_{cyc}$ represents a sum value of the central thickness of the concave lens and the central thickness of the cylindrical lens, $H_{cyc}$ represents a distance between the main surface of the concave lens and the main surface of the cylindrical/concave composite lens, $F_{coc}$ represents a distance between the main surface of the concave lens and the focal point of the collimator/concave composite lens, $F_{all}$ represents a distance between the main surface of the cylindrical/concave composite lens and the focal point of the three composite lens, $S_1$ is a distance between the focal point of the collimator/concave composite lens and the surface of the PD, and $S_2$ is a distance between the focal point of the three composite lens and the surface of the PD.

1. In the return optical path of the optical pickup apparatus, as shown in FIG. 7, the collimator lens and the composite lens of the cylindrical lens and the concave lens are combined. Here, assuming that:

lens distance=d;

composite lens focal distance f; and focal distance of each lens $f_1$, $f_2$, since $$1/f = 1/f_1 + 1/f_2 - d/(f_1^*f_2),$$

the composite system of these two lenses in geometric optics can be described by a following expression.

$$f = -f_1^*f_2/(d - f_1 - f_2).$$

2. The parallel light flux incident to the collimator lens after the objective lens is condensed or focused at a focal point of the composite lens after the collimator lens.

The distance from the second lens position to the focal point of the composite lens can be described by a following expression.

$$\begin{aligned}F_2 &= (1-dK_1)/K\\ &= (1-d/f)/f\\ &= ((f_1-d)/f_1)*((f_1*f_2)/(d-f_1-f_2))\\ &= -f_2(f_1-d)/(d-f_1-f_2)\end{aligned}$$

3. The distance from the $f_2$ of the second lens to the main surface H' (rear side) of the composite lens is expressed by a following expression.

$$\begin{aligned}H_2 &= -dK_1/K\\ &= -d/f/f_1\\ &= f_2*d/(d-f_1-f_2)\end{aligned}$$

4. Upon application to the actual optical path, it is considered as following. At first, the focal distance $f'_{cyc}$ of the composite lens of the cylindrical lens and the concave lens (hereinbelow, it is referred to as "a cylindrical/concave composite lens") is expressed as following.

$$f'_{cyc}=-f'_{cy}*f'_{cc}/(d_{cyc}-f'_{cy}-f'_{cc}) \tag{1}$$

Here, the reference mark $f'_{cy}$ represents the focal distance of the cylindrical lens, $f'_{cc}$ represents the focal distance of the concave lens, and the $d_{cyc}$ is the main surface interval of the cylindrical/concave composite lens.

Figure 8A:
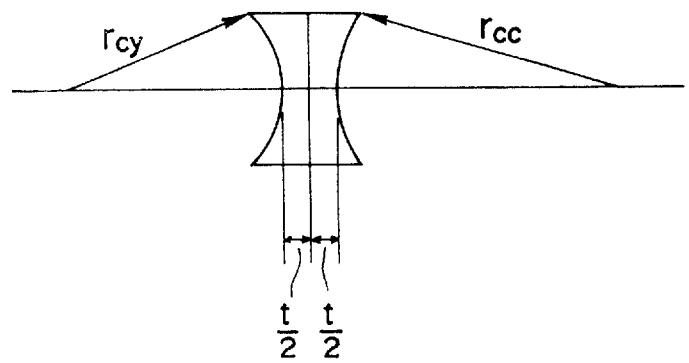
FIG. 8A is one diagram showing the trace of the paraxial ray for explaining the focal distance etc. of a cylindrical and concave composite lens in the optical pickup apparatus of FIG. 1.

Assuming that the refractive index of the lens is $n_L$, the radius of the cylindrical lens is $r_{cy}$ and the radius of the concave lens is $r_{cc}$ as indicated in FIG. 8A, the focal distances $f'_{cy}$ and $f'_{cc}$ can be obtained by following expressions respectively.

$$f'_{cy}=r_{cy}/(n_L-1) \tag{2}$$

$$f'_{cc}=r_{cc}/(n_L-1) \tag{3}$$

Figure 8B:
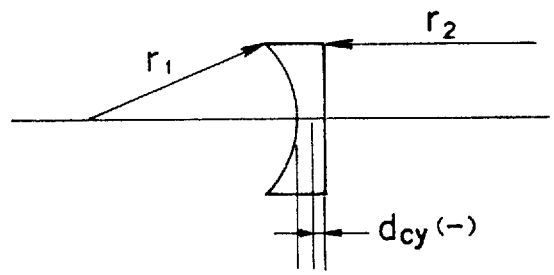
FIG. 8B is another diagram showing the trace of the paraxial ray for explaining the focal distance etc. of the cylindrical and concave composite lens in the optical pickup apparatus of FIG. 1.

Further, the central thickness $d'_{cy}$ of the cylindrical lens is expressed by a following expression, as indicated in FIG. 8B.

$$d_{cy}=-t/2n_L$$

Figure 8C:
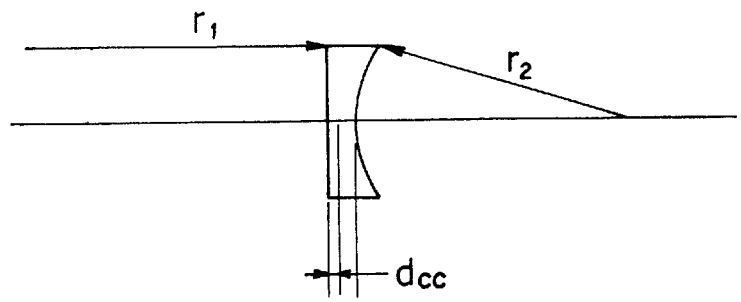
FIG. 8C is another diagram showing the trace of the paraxial ray for explaining the focal distance etc. of the cylindrical and concave composite lens in the optical pickup apparatus of FIG. 1.

The central thickness $d_u$ of the concave lens is expressed by a following expression, as indicated in FIG. 8C.

$$d_u=t/2n_L$$

Thus, the value $d_{cyc}$ is expressed by a following expression (4).

$$d_{cyc}=t/n_L \tag{4}$$

Therefore, if the lens specification is set as followings,
refractive index: $n_L=1.49$
radius of the cylindrical lens $r_{cy}=-35$
radius of the concave lens: $r_{cc}=8$
thickness of the cylindrical/concave composite lens: $t=2$
focal distance of the collimator lens: $f'_{co}=18$,
then, $$f'_{cy}=-71.429$$

$$f'_{cc}=-16.327$$

$$d_{cyc}=1.342.$$

Thus, by use of the aforementioned expression (1), the focal distance $f'_{cyc}$ can be determined as following, in this example.

$$f'_{cyc}=-13.089$$

On the other hand, the distance $H_{cyc}$ from the main surface of the concave lens to the main surface of the cylindrical/concave composite lens is expressed by a following expression.

$$H_{cyc}=-f'_{cc}*d'_{cyc}/[-(d_{cyc}-f'_{cy}-f'_{cc})]$$

Thus, it can be determined as following, in this example.

$$H_{cyc}=-0.246$$

On the other hand, the composite focal distance $f'_{all}$ of the collimator lens, the cylindrical lens and the concave lens is expressed as following.

$$f'_{all}=-f'_{co}*f'_{cyc}/(d_{cocyc}-f'_{co}-f'_{cyc}) \tag{5}$$

Therefore, assuming that:
the composite focal distance: $f'_{all}=29.505$; and
the focal distance of the objective lens: $f'_{ob}=3.349$,
then, the image formation magnification $\beta_1$ can be determined as following.

$$\beta_1=f'_{all}/f'_{ob}=29.505/3.349=8.81$$

At this time, the interval $d_{cocyc}$ between the collimator lens and the cylindrical/concave composite lens can be determined as following.

$$d_{cocyc}=12.896$$

On the other hand, the distance $d_{coc}$ between the main surface of the collimator lens to the main surface of the concave lens is as following.

$$d_{coc}=d_{cocyc}-H_{cyc}$$

Thus, it can be concretely determined as following, in this example.

$$d_{coc}=12.896-(-0.246)=13.142$$

The composite focal distance $f'_{coc}$ of the collimator lens and the concave lens is expressed as following.

$$f'_{coc}=-f'_{co}*f'_{cc}/(d_{coc}-f'_{co}-f'_{cc})$$

Thus, it can be concretely determined as following, in this example.

$$f'_{coc}=25.624$$

If each lens is arranged in accordance with the above explained parameters, the focal point of each of the composite lens system composed of the collimator lens, the cylindrical lens and the concave lens are positioned to a point apart from the position of the cylindrical/concave composite lens by the distance $F_{all}$. The concrete value of the distance $F_{all}$ is as following, in this example.

$$F_{all}=2.366$$

In the same manner, the focal point of the composite lens system composed of the collimator lens and the concave lens is apart from the position of the concave lens by the distance $F_{coc}$. The concrete value of the distance $F_{coc}$ is as following, in this example.

$$F_{coc}=6.915.$$

From the above described study, the distance between the collimator lens and the cylindrical lens in the design of the composite lens is determined as following.

$$d_{coc} - d_{cyc} = 13.142 - 1.342 = 11.8$$

Further, the astigmatic distance AS is determined as following.

$$AS = F_{alt} + H_{cyc}(-) - F_{coc} = 1.205$$

Figure 9:
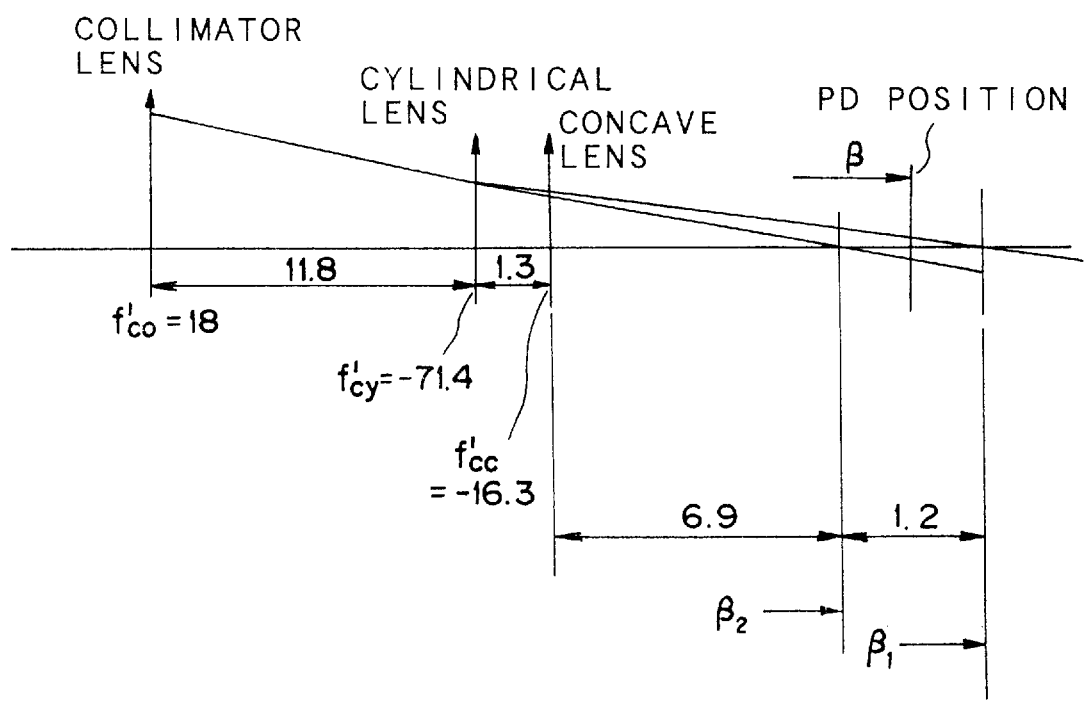
FIG. 9 is a diagram showing the trace of the paraxial ray for explaining a concrete position of each lens in one design example of the optical system in the embodiment of the present invention.

The results obtained in the above explained example are shown in FIG. 9. From these results, the return magnification of the composite lens system of the collimator lens and the concave lens is given by a following expression.

$$\beta_2 = f'_{coc}/f'_{ob} = 25.624/3.349 = 7.65$$

Thus, assuming that the return magnification β is the value obtained by taking the average value of the return magnifications $\beta_1$ and $\beta_2$ as following.

$$\beta = 8.23$$

Thus, the S letter interval (see FIG. 4C) can be determined as following.

$$S = AS/(2\beta^2) = 0.0089$$

At this time, assuring that $$d' = 0.032,$$

then, $$20 \, log(S/2d')^2 = -34,$$

which means that the enough bit error ratio can be obtained.

As explained above, if the optical system is designed so as to satisfy the expression of S<0.63 d', the cross talk can be diminished and the enough bit error ratio after the correction can be obtained.

In the above explanations, the case where the optical pickup apparatus is a single focal type has been explained. However, it is not limited to -this. For example, the present invention can be adapted to the optical pickup apparatus of the bifocal type.

Further, in the above explanations, the case where the astigmatic method is adopted as the focus error signal generation method has been explained. However, it is not limited to this. For example, a known focus error signal generation method such as a knife-edge method, a wedge-prism method, a critical angle method or the like may be adopted in place of the astigmatic method.

As describe above in detail, according to the present embodiment, by designing the optical system so as to satisfy the expression of S<0.63 d/n (wherein S represents the S letter interval, d represents the interval between the information record layers and n represents the refractive index of the spacer medium between the information record layers), the cross talk (which is the ratio of the light detection signal from one record layer to be reproduced with respect to that from another record layer and can be expressed as the ratio of the area of the light spot of the reflection light from each information record layer condensed or focused on the photo detector) can be diminished, and the random noise can be diminished either. As a result of this, the bit error ratio after correction can be restrained to be enough low level, so that a precise and excellent reproducing operation of the information record medium can be performed.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An optical pickup apparatus for reproduction of an information record medium in which information multiple recording layers are formed, said apparatus comprising:

a light source for emitting a light beam;

a light detector for detecting a reflection light beam and outputting a light detection signal corresponding to the detected reflection light beam;

an optical system for condensing the emitted light beam onto one of the information recording layers and condensing the light beam reflected from said one of the information recording layers as the reflection light beam onto the light detector; and an actuator for at least partially actuating said optical system in a focus servo direction to focus-servo-control the emitted light beam with respect to said one of the information recording layers on the basis of a focus error signal generated from the light detection signal outputted by said light detector, said optical system being designed so as to satisfy the expression of S<0.63 d/n wherein S represents a distance between two focal points of said actuated optical system which respectively give maximum and minimum values of the focus error signal, d represents an interval between the information recording layers, and n represents a refractive index of a spacer medium between the information recording layers.

2. An apparatus according to claim 1, wherein said optical system comprises at least one of an objective lens, a collimator lens, a cylindrical lens and a concave lens.

3. An apparatus according to claim 1, wherein said light detector comprises a four divided detector.

* * * * *